March 20, 1956  W. M. HAESSLER  2,738,797
TWO-WAY CHECK VALVE

Filed Dec. 26, 1951  2 Sheets-Sheet 1

INVENTOR.
WALTER M. HAESSLER
BY
Edward V. Connors
ATTORNEY.

March 20, 1956 W. M. HAESSLER 2,738,797
TWO-WAY CHECK VALVE
Filed Dec. 26, 1951 2 Sheets-Sheet 2
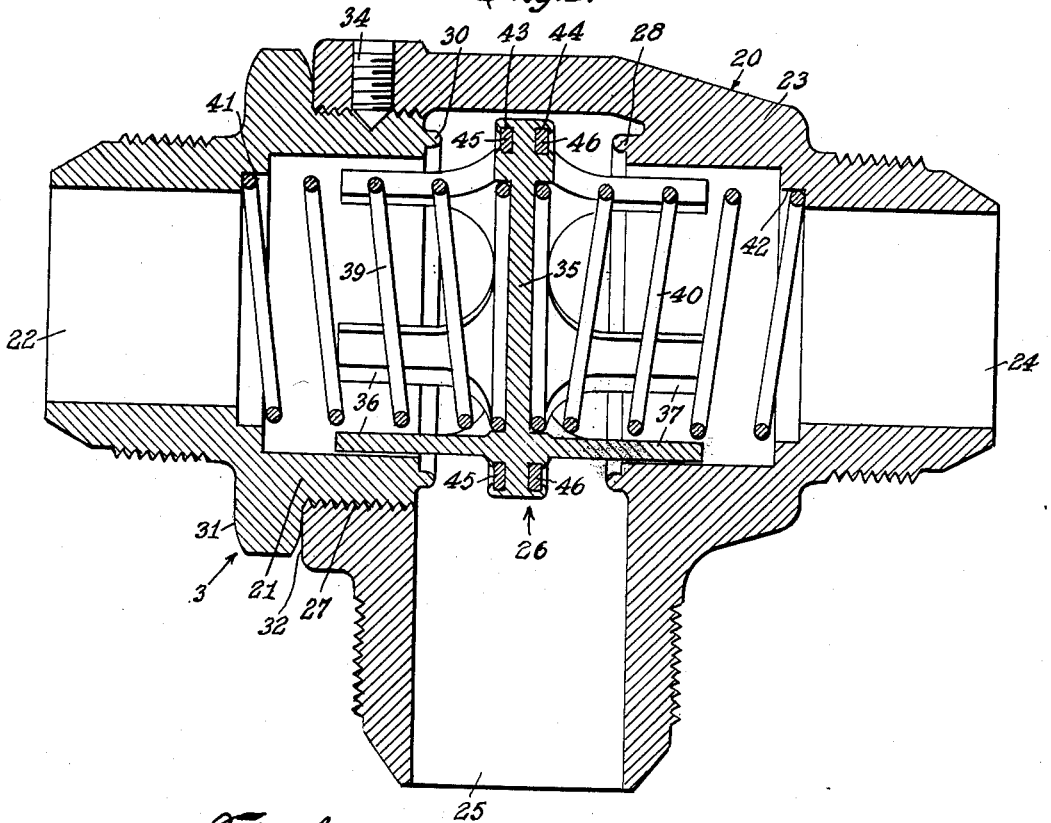
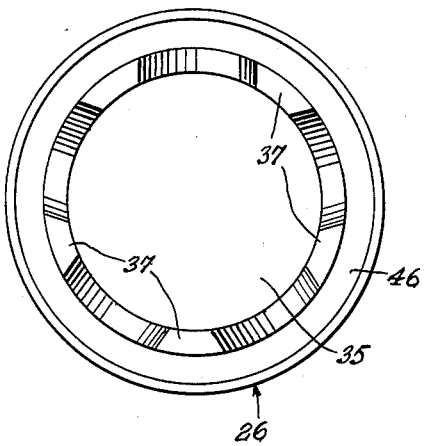
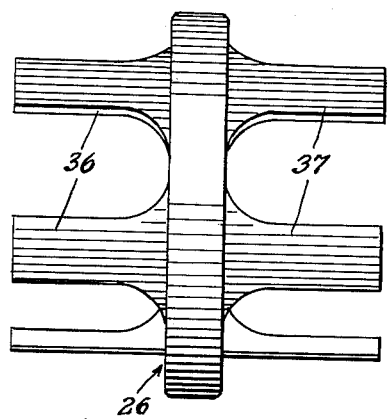
INVENTOR.
WALTER M. HAESSLER
BY
Edward P. Connors
ATTORNEY

United States Patent Office 2,738,797
Patented Mar. 20, 1956

2,738,797
TWO-WAY CHECK VALVE

Walter M. Haessler, Chatham, N. J., assignor to C-O-Two Fire Equipment Company, Newark, N. J.

Application December 26, 1951, Serial No. 263,434

3 Claims. (Cl. 137—113)

The present invention relates to fire extinguishing apparatus and particularly to a two-way check valve to divert a flow of fluid from either of a pair of sources to a single hazard to be protected against fire.

The check valve is particularly suitable for use in airplane fire extinguishing systems in which it is often desirable to apply a reserve discharge of extinguishing fluid in addition to the initial discharge. It is important that the airplane extinguishing system be positive in operation and light in weight. Difficulty has been had in some systems with the the prior check valve in that it has assumed a position closing one inlet and has failed to allow possible leakage fluid to vent through the outlet. The present invention aims to overcome the difficulties and disadvantages of prior devices by providing a two-way check valve in which the valve member is normally maintained at a position spaced from both of its inlet seats so as to provide for drainage of both inlets.

Another object of the invention is to provide a two-way check valve which is simple and economical in manufacture, efficient in operation, and durable in use.

In accordance with the invention this is accomplished by providing a two-way check valve having a pair of inlets and an outlet, each inlet being provided with a valve seat. A floating spring supported valve member is reciprocally movable to close either of the inlets, the supporting springs being arranged to normally hold the valve member spaced from both valve seats.

Other objects and advantages of the invention will be apparent from the following description and from the accompanying drawings which show, by way of example, an embodiment of the invention.

In the drawings:

Figure 3 is a vertical sectional view of the check valve in accordance with the invention.

Figure 4 is an end view of the valve member for the check valve.

Figure 5 is a side view of the valve member shown in Figure 4.

Figure 1:
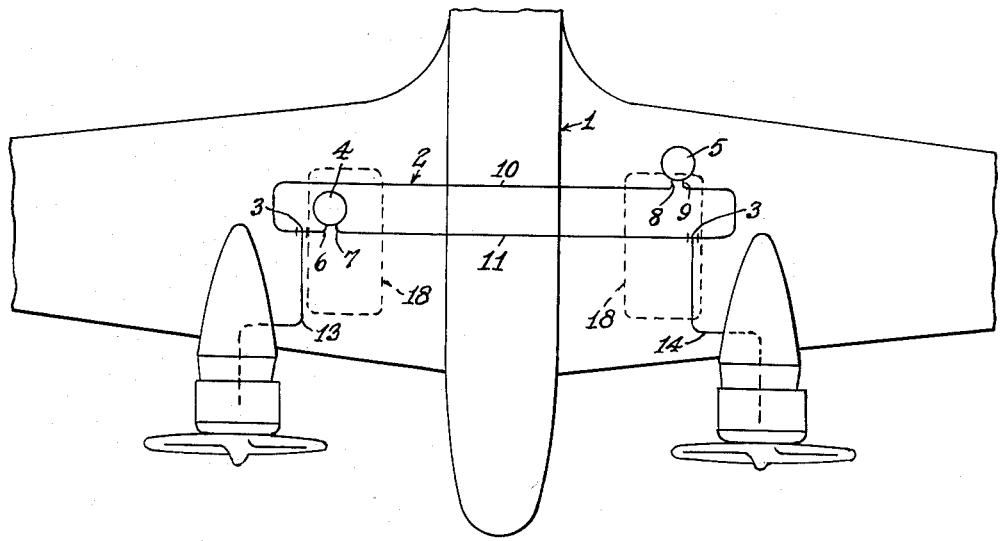
Figure 1 is a plan view of a portion of an airplane schematically showing a fire extinguishing system incorporating a two-way check valve in accordance with the invention.
Figure 2:
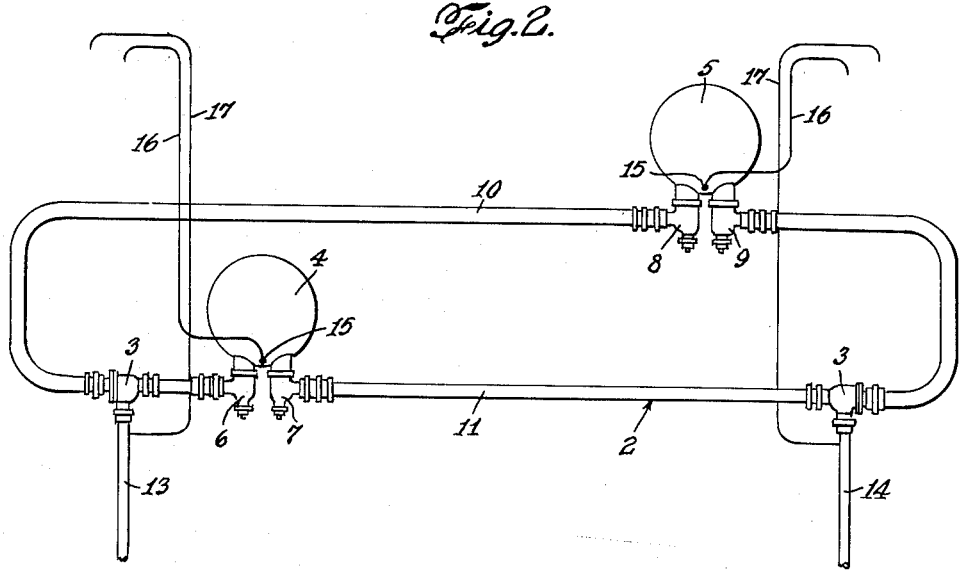
Figure 2 is a schematic diagram of the fire extinguishing system incorporating the check valve.

Referring to the drawings, there is shown in Figure 1 an airplane 1 incorporating a fire extinguishing system 2 of the double application two hazard type utilizing direction valves 3 in accordance with the invention. Fire extinguishing fluid is stored in a pair of spherical containers 4 and 5 respectively having dual discharge outlets 6 and 7 on container 4, and dual outlets 8 and 9 on container 5. Pipes 10 and 11 connect the discharge outlets to the inlets of the two check valves 3. The outlets of the check valves 3 are connected by pipes 13 and 14 leading respectively to the spaces about the right-hand and left-hand motors.

The spherical tanks 4 and 5 are alike and each is adapted to be charged with a pressurized fire extinguishing agent, the contents being releasable by actuation of any one of the electrically actuated discharge valves 6 through 9 of the cutter type in which the electrical discharge of an explosive cartridge ruptures a sealing disc allowing the pressurized fire extinguishing fluid to escape. The discharge valves 6 through 9 may be of the type shown in my co-pending patent application Serial No. 263,433, filed December 26, 1951, now Patent No. 2,661,804 issued December 8, 1953.

Safety outlets 15 are provided for the tanks 4 and 5 and connected by discharge pipes 16 to suitable outboard indicators (not shown) at the outer ends of the pipes. System discharge indication is provided by suitable outboard indicators (not shown) on the outer ends of pipes 17 leading from tap connections to the pipes 13 and 14. The tanks 4 and 5 may be mounted in any convenient location in the airplane. In some installations it has been preferred to install the tanks above or adjacent the wheel wells of the airplane, indicated in dotted lines 18 on Figure 1, in order that easy inspection access may be had while the airplane is on the ground.

The check valves 3 are of like construction and are shown in detail in Figures 3-5. The check valve 3 includes a casing 20 formed in two parts, a closure member 21 including an inlet 22, and a housing member 23 including an inlet 24 and outlet 25. Within the housing 23 is reciprocally mounted a check valve member 26.

The housing member 23 is preferably cast of aluminum alloy for lightness in construction and has its inlet and outlet threaded for connection in the piping system. A valve seat 28 is formed within the housing member 23 about the inlet 24. The open end of the housing member 23 is threaded as indicated at 27 to receive the closure member 21. A valve seat 30 is formed on the inner edge of the closure member 21 about the inlet 22.

It should be noted that the housing is so arranged that the valve seats 28 and 30 are positioned practically in alignment with opposite sides of the wall of the outlet 25 for symmetry of fluid flow. The closure member 21 is made with an enlarged portion 31 to provide a purchase for engagement by a wrench to secure the parts together, the enlarged portion 31 also providing a shoulder to engage against end 32 of the housing 20 so that when the parts are threadedly engaged, a tight seal will be provided and the valve seat 30 will be in the proper position. End 32 of the housing 20 is apertured and threaded to receive a set screw 34 to prevent a possible unscrewing of the threaded parts of the housing.

The valve member 26 is fabricated of cast or wrought material such as of stainless steel made in a one-piece construction and includes a disc center portion 35 having extending outwardly therefrom guiding extensions 36 on its left-hand side and 37 on its right-hand side. The guiding portions are longitudinally positioned and radially spaced and extend back over the ends of springs 39 and 40. The springs 39 and 40 provide supporting and positioning means for the valve member 26 and are designed to provide vibrational stability as well as to seal off and retain pressure under desired operating conditions. The outer end of the spring 39 is received in a recess 41 formed about the inlet 22 and the outer end of spring 40 is received in a recess 42 in the housing 20. The disc portion 35 has its edge extending outwardly beyond the guiding member 36 and 37 and on opposite sides thereof are recesses 43 and 44 to receive ring-shaped seating members 45 and 46 preferably made of a material suitable to seal the flow of extinguishing fluid and compatible therewith. The ring-shaped members 45 and 46 are preferably secured in position by turning inwardly the edges of the recesses 43 and 44, although other conventional securing means may be used.

In the operation of the check valve 3 fluid is discharged from one of the spherical containers 4 or 5 by the actuation of one of the electrical discharge plugs 6 through 9. The fluid entering the inlet of the valve 3 impinges against the disc center portion 35 and moves the valve member 26 into position to seal off the opposite inlet, the valve member 26 is then held positioned at that side of the outlet by the pressure of the fluid so that there is a clear flow for the fluid through the spaces between the guiding members 36 or 37. After the discharge has been completed and the pressure has dropped, the valve member 26 returns to its normal position between the inlets, thereby providing for the draining of any fluid which may remain in the lines and positioning itself for the next operation.

While the invention has been described and illustrated with reference to a specific embodiment thereof, it will be understood that other embodiments may be resorted to without departing from the invention. Therefore, the form of the invention, as set out above, should be considered as illustrative and not as limiting the following claims.

I claim:

1. A two-way fire extinguisher check valve comprising a housing having a pair of inlets and an outlet, the inlets enlarged at their inner ends to form a valve chamber, a valve seat about each inlet, a valve member to engage either valve seat to close the corresponding inlet, a spring on each side of the valve member, the valve member having a disc-shaped center portion and having a slotted tubular guide member portion extending away from the disc portion on each side thereof over the ends of the springs, the guide member portions positioned inwardly from the edge of the disc portion and of an inner diameter at least as large as the diameter of the inlet, the springs each of a diameter at least as large as the inlet and abutting at one end against the wall of the valve chamber and at the other end against the disc shaped center portion, an annular recess on each side of the disc portion outwardly of the guide members, and a ring-shaped valve seating member positioned in each recess, the edges of the recesses turned inwardly to hold the valve seating members in position, the springs normally providing the sole support for the valve member maintaining it free from contact with the inner surface of the housing.

2. A two-way fire extinguisher check valve comprising a housing in separable parts threadedly engaged with each other, one part having a first inlet, the other part having a second inlet positioned opposite the first inlet and an outlet positioned approximately at right angles to the inlets, the housing having an enlarged passage portion adjacent each inlet and defining guideway space, the change in diameter of the guideway at the intersection with the inlet providing first shoulder means, the housing having a further enlarged portion defining a valve chamber and positioned between the two guideway spaces, the change in diameter of the passage at the intersection of the guideway space and the valve chamber providing second shoulder means, an inwardly turned valve seat on each second shoulder, the axial distance between the valve seats less than the diameter of either valve seat and approximately equal to the diameter of the outlet, a valve member having a disc-shaped center portion, guide member portions having slot-like spaces therebetween with an open area at least as great as either inlet, the guide member portions extending axially from the center portion on each side thereof, the outer diameter of the guide member portions of a smaller diameter than the diameter of the guideway spaces, the inner diameter of the guide member portions of a diameter at least as large as the diameter of either inlet, ring-like valve seating members on each side of the valve disc and of a diameter to engage the valve seats, and a pair of valve springs, one positioned on each side of the valve disc within the guide member portions, one end of each spring abutting against the first shoulder means and the other end of each spring abutting against the disc-shaped center portion of the valve member, whereby upon the entry of fluid through either inlet the valve member is moved to close the other inlet without substantially reducing the passage area through the valve.

3. A two-way fire extinguisher system check valve comprising a housing having a pair of inlets and an outlet, a valve seat about each inlet, means forming a guideway between the valve seats and each inlet, a double-faced valve member to alternatively engage either valve seat to close the corresponding inlet, a spring on each side of the valve member, the valve member having a disc-shaped center portion, the edge of each side thereof forming valve-seat engaging surfaces, and guiding extensions arranged in tubular configuration for each side of the disc-shaped center portion, each of the guiding extensions overlying its corresponding spring, each of the guiding extensions appreciably smaller in diameter than its guideway and the disc-shaped center portion of the valve member appreciably smaller in diameter than the valve chamber, whereby the springs provide a floating support for the valve member normally maintaining the valve member free from contact with the inner surface of the housing.

References Cited in the file of this patent

UNITED STATES PATENTS

| | | |
|---|---|---|
| 1,588,657 | Christensen | June 15, 1926 |
| 1,870,484 | Basta | Aug. 9, 1932 |
| 1,967,383 | Turgot | July 24, 1934 |
| 2,354,791 | Boldt | Aug. 1, 1944 |
| 2,445,547 | Wheeler | July 20, 1948 |
| 2,534,871 | Lichtman | Dec. 19, 1950 |
| 2,634,743 | Audemar | Apr. 14, 1953 |